(12) United States Patent
Sturgin (10) Patent No.: US 10,508,698 B2
(45) Date of Patent: Dec. 17, 2019

(54) SLIP MECHANISM WITH SERIES TORQUE CAPACITY AND OVER DRIVE FUNCTION

(71) Applicant: Schaeffler Technologies AG & Co. KG, Herzogenaurach (DE)

(72) Inventor: Todd Sturgin, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 189 days.

(21) Appl. No.: 15/835,539

(22) Filed: Dec. 8, 2017

(65) Prior Publication Data

US 2019/0178314 A1    Jun. 13, 2019

(51) Int. Cl.
*F16D 47/04* (2006.01)
*F16D 41/12* (2006.01)
*F16D 45/00* (2006.01)
*F16D 43/208* (2006.01)

(52) U.S. Cl.
CPC ............ *F16D 47/04* (2013.01); *F16D 41/12* (2013.01); *F16D 43/208* (2013.01); *F16D 45/00* (2013.01)

(58) Field of Classification Search
CPC .......... F16D 47/02; F16D 47/04; F16D 43/20; F16D 43/202; F16D 43/2028; F16D 43/204; F16D 43/208; F16D 45/00; F16D 15/00; F16D 7/04; F16D 7/048; F16D 7/06; F16D 7/10
See application file for complete search history.

(56) References Cited

U.S. PATENT DOCUMENTS

| | | | | |
|---|---|---|---|---|
| 4,598,801 A * | 7/1986 | Villata | .................. | F16D 65/567 188/196 BA |
| 5,916,325 A * | 6/1999 | Madrid | ..................... | F16D 7/10 192/56.1 |
| 7,721,861 B2 * | 5/2010 | Zhong | ....................... | F16D 7/10 192/48.92 |
| 9,856,930 B2 * | 1/2018 | Heath | .................... | B60K 17/02 |
| 2007/0010366 A1 * | 1/2007 | Larin | ................... | F16D 41/064 475/249 |
| 2013/0284477 A1 * | 10/2013 | Braun | ..................... | B23Q 5/58 173/176 |

* cited by examiner

*Primary Examiner* — David R Morris
*Assistant Examiner* — James J Taylor, II (57) ABSTRACT

A slip clutch, including: an output hub; a first hub; a second hub non-rotatably connected to the output hub; an input hub arranged to receive rotational torque. The input hub includes: a first plurality of balls; a first plurality of springs urging the first plurality of balls radially outwardly into contact with the first hub; a second plurality of balls; and a second plurality of springs urging the second plurality of balls radially outwardly into contact with the second hub.

20 Claims, 9 Drawing Sheets

SLIP MECHANISM WITH SERIES TORQUE CAPACITY AND OVER DRIVE FUNCTION

TECHNICAL FIELD

The present disclosure relates to a slip clutch with series torque capacity and over drive function. In an example embodiment, the slip clutch includes torque capacity dependent upon a direction of rotational torque.

BACKGROUND

Known slip clutch mechanisms have difficulty providing opening and closing functionality while enabling over drive functionality.

SUMMARY

According to aspects illustrated herein, there is provided a slip clutch, including: an output hub; a first hub; a second hub non-rotatably connected to the output hub; an input hub arranged to receive rotational torque. The input hub includes: a first plurality of balls; a first plurality of springs urging the first plurality of balls radially outwardly into contact with the first hub; a second plurality of balls; and a second plurality of springs urging the second plurality of balls radially outwardly into contact with the second hub.

According to aspects illustrated herein, there is provided a slip clutch, including: an axis of rotation; an output hub; a first hub; a second hub non-rotatably connected to the output hub; an input hub arranged to receive rotational torque; and a plurality of one-way clutches. The input hub includes a first slip clutch assembly non-rotatably connecting the input hub and the first hub with a first force, and a second slip clutch assembly non-rotatably connecting the input hub and the second hub with a second force. The plurality of one-way clutches: are non-rotatably connecting the first hub and the output hub for relative rotation of the first hub, with respect to the output hub, in a first circumferential direction; and enable rotation between the first hub and the output hub, for relative rotation of the first hub, with respect to the output hub, in a second circumferential direction, opposite the first circumferential direction.

According to aspects illustrated herein, there is provided a slip clutch, including: an axis of rotation; an output hub; a first hub; a second hub; a third hub non-rotatably connected to the output hub and axially disposed between the first and second hubs; an input hub arranged to receive rotational torque; a first plurality of one-way clutches; and a second plurality of one-way clutches. The input hub includes: a first slip clutch assembly non-rotatably connecting the input hub and the first hub with a first force; a second slip clutch assembly non-rotatably connecting the input hub and the second hub with a second force; and a third slip clutch assembly non-rotatably connecting the input hub and the third hub with a third force. The first plurality of one-way clutches non-rotatably connects the first hub and the output hub for relative rotation of the first hub, with respect to the output hub, in a first circumferential direction. The second plurality of one-way clutches non-rotatably connects the second hub and the output hub for relative rotation of the second hub, with respect to the output hub, in the first circumferential direction.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 9:
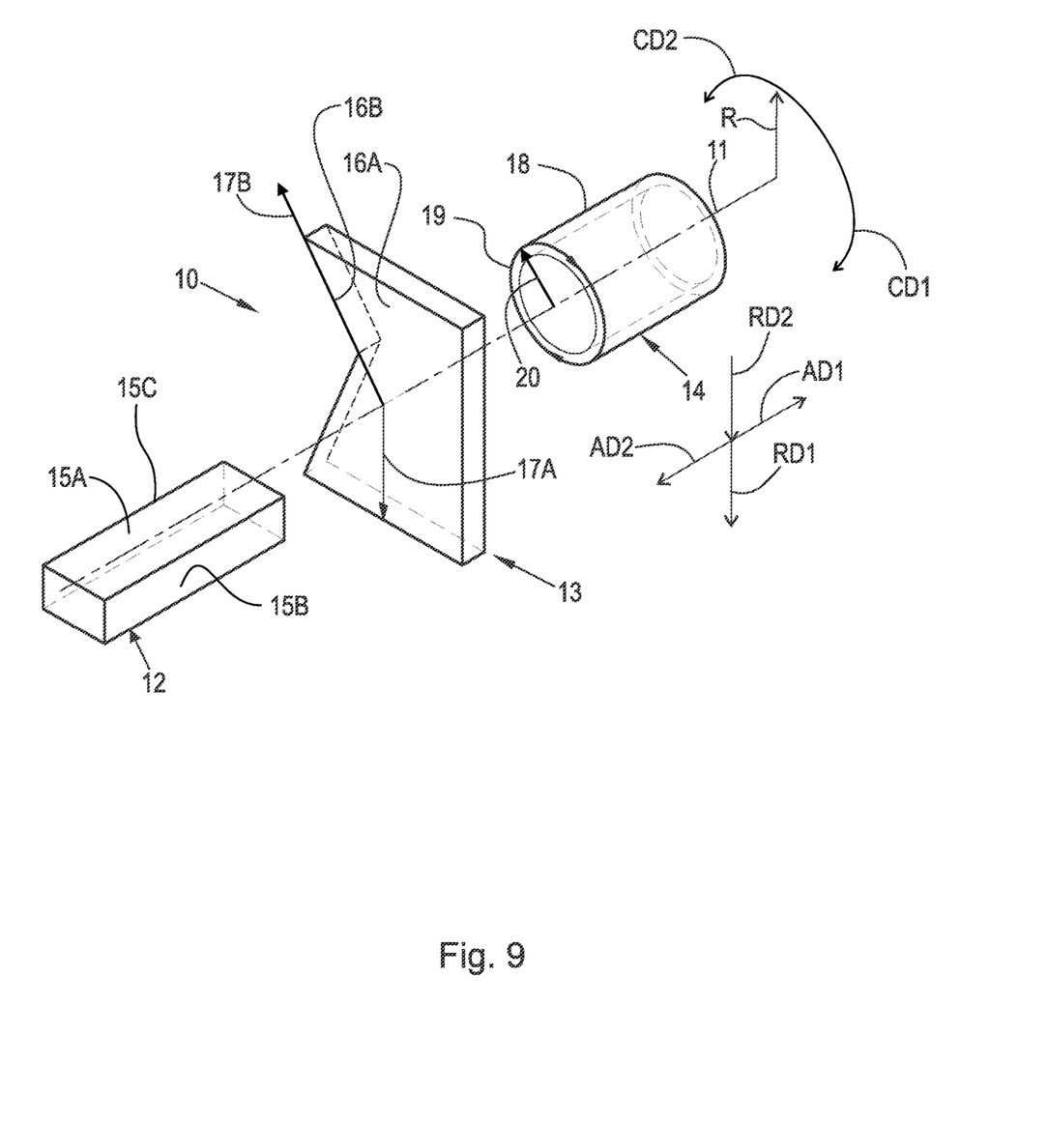
FIG. 9 is a perspective view of a cylindrical coordinate system demonstrating spatial terminology used in the present application.

FIG. 9 is a perspective view of cylindrical coordinate system 10 demonstrating spatial terminology used in the present application. The present application is at least partially described within the context of a cylindrical coordinate system. System 10 includes axis of rotation, or longitudinal axis, 11, used as the reference for the directional and spatial terms that follow. Opposite axial directions AD1 and AD2 are parallel to axis 11. Radial direction RD1 is orthogonal to axis 11 and away from axis 11. Radial direction RD2 is orthogonal to axis 11 and toward axis 11. Opposite circumferential directions CD1 and CD2 are defined by an endpoint of a particular radius R (orthogonal to axis 11) rotated about axis 11, for example clockwise and counterclockwise, respectively.

To clarify the spatial terminology, objects 12, 13, and 14 are used. As an example, an axial surface, such as surface 15A of object 12, is formed by a plane co-planar with axis 11. However, any planar surface parallel to axis 11 is an axial surface. For example, surface 15B, parallel to axis 11 also is an axial surface. An axial edge is formed by an edge, such as edge 15C, parallel to axis 11. A radial surface, such as surface 16A of object 13, is formed by a plane orthogonal to axis 11 and co-planar with a radius, for example, radius 17A. A radial edge is co-linear with a radius of axis 11. For example, edge 16B is co-linear with radius 17B. Surface 18 of object 14 forms a circumferential, or cylindrical, surface. For example, circumference 19, defined by radius 20, passes through surface 18.

Axial movement is in axial direction AD1 or AD2. Radial movement is in radial direction RD1 or RD2. Circumferential, or rotational, movement is in circumferential direction CD1 or CD2. The adverbs "axially," "radially," and "circumferentially" refer to movement or orientation parallel to axis 11, orthogonal to axis 11, and about axis 11, respectively. For example, an axially disposed surface or edge extends in direction AD1, a radially disposed surface or edge extends in direction RD1, and a circumferentially disposed surface or edge extends in direction CD1.

Figure 1:
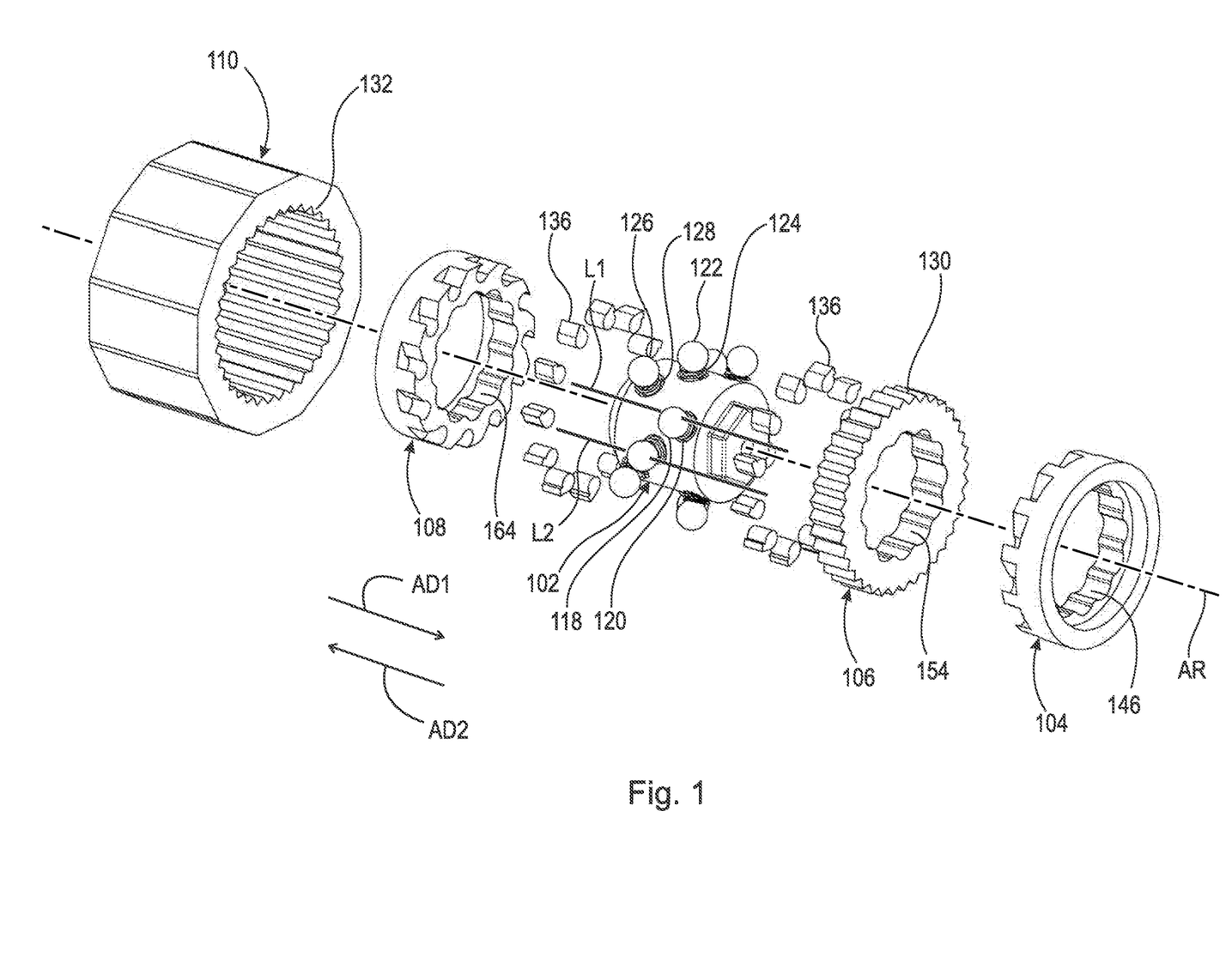
FIG. 1 is an exploded view of a slip clutch with direction dependent torque capacity.

FIG. 1 is a front exploded view of slip clutch 100.

Figure 2:
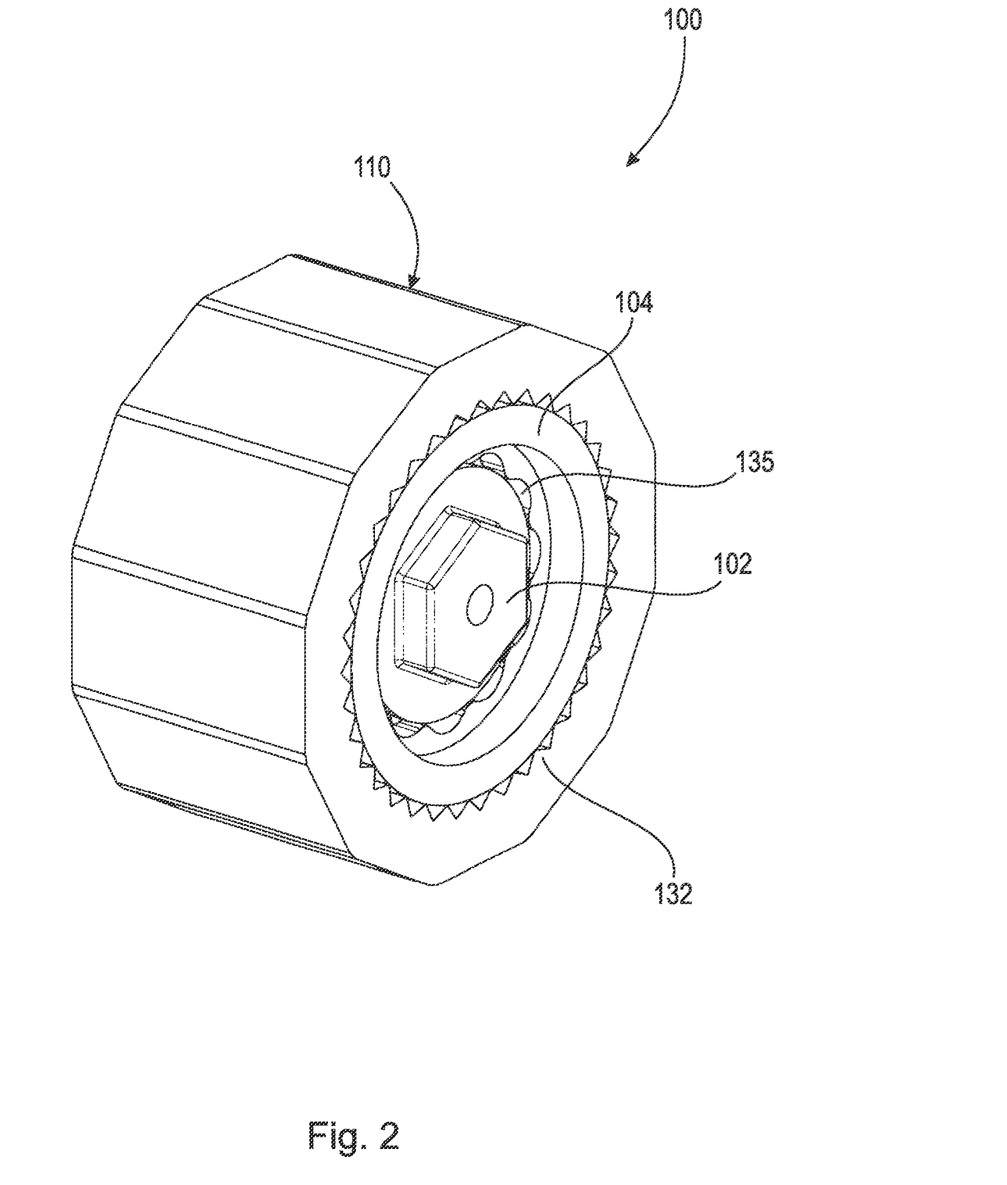
FIG. 2 is a perspective front view of the slip clutch shown in FIG. 1.

FIG. 2 is a perspective front view of slip clutch 100 shown in FIG. 1.

Figure 3:
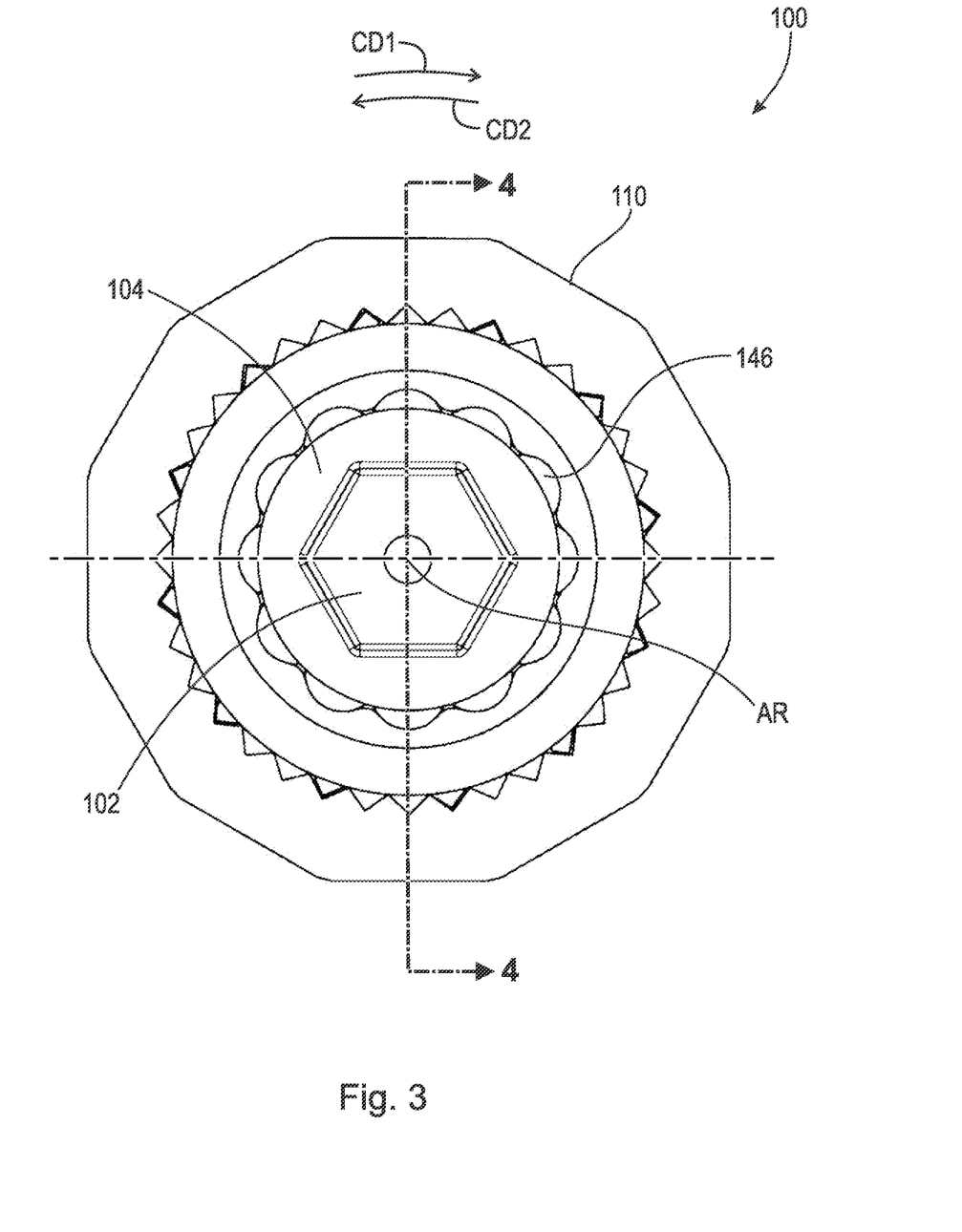
FIG. 3 is a front view of the slip clutch shown in FIG. 1.

FIG. 3 is a front view of slip clutch 100 shown in FIG. 1.

Figure 4:
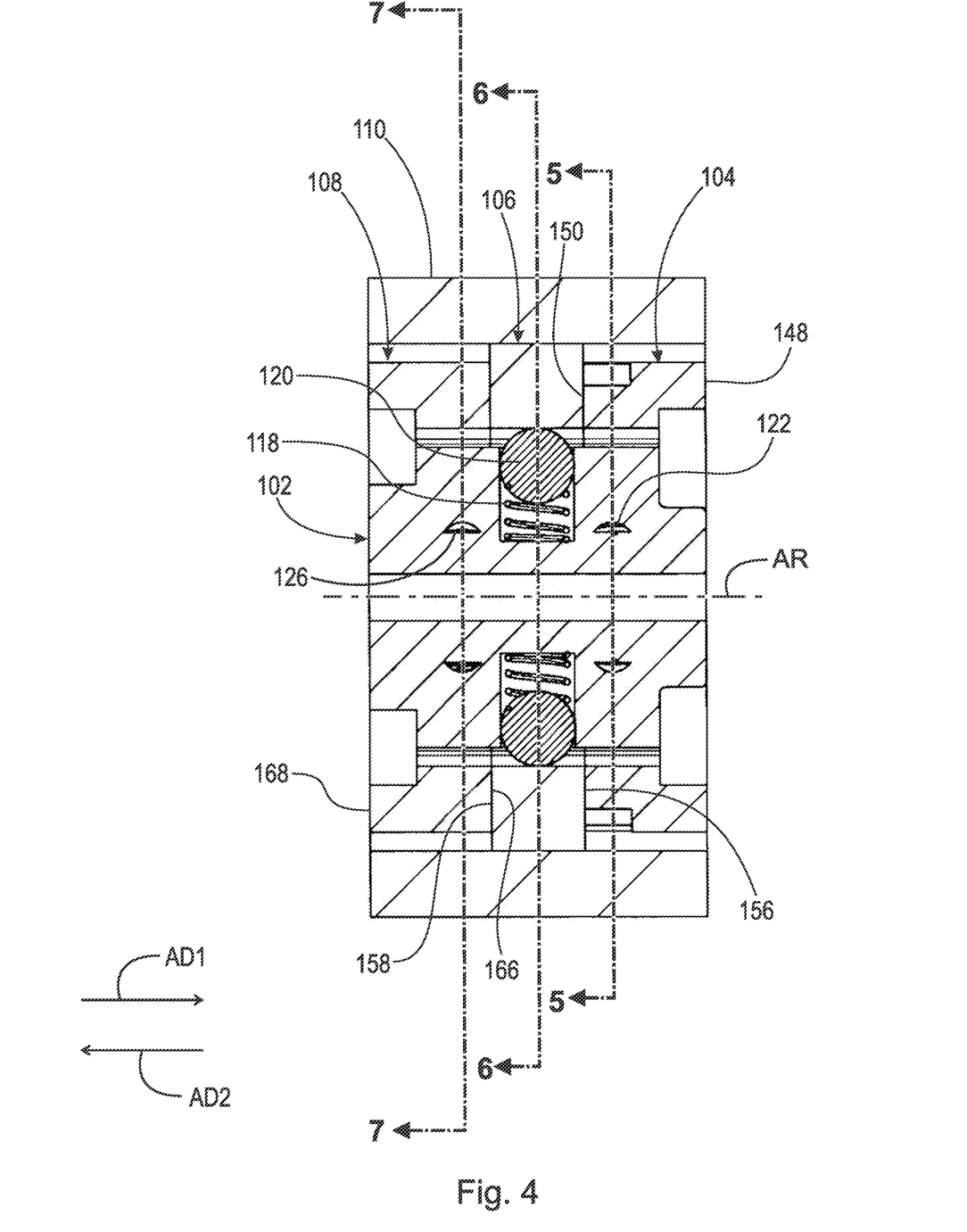
FIG. 4 is a cross-sectional view generally along line 4-4 in FIG. 3.

FIG. 4 is a cross-sectional view generally along line 4-4 in FIG. 3.

Figure 5:
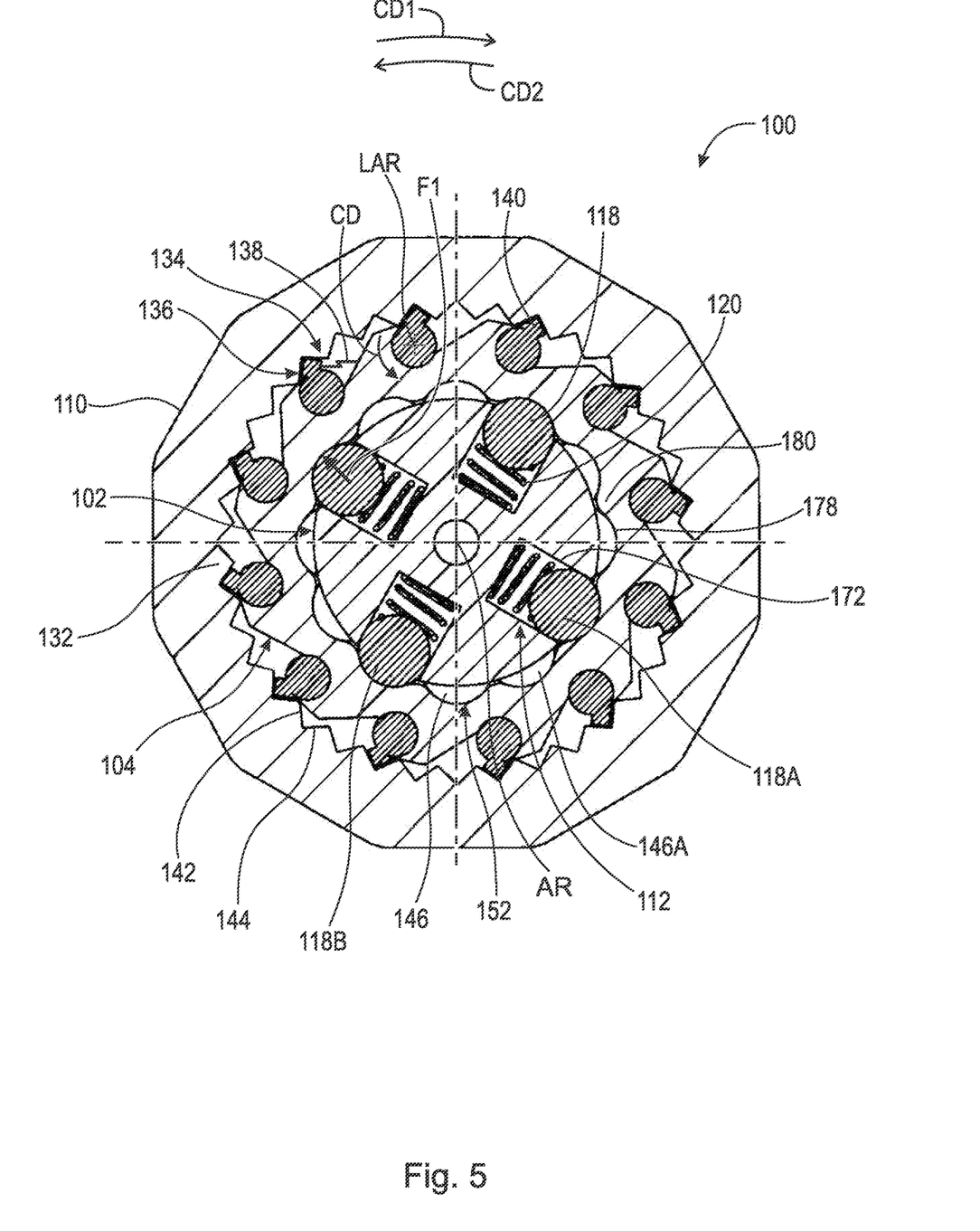
FIG. 5 is a cross-sectional view generally along line 5-5 in FIG. 4.

FIG. 5 is a cross-sectional view generally along line 5-5 in FIG. 4.

Figure 6:
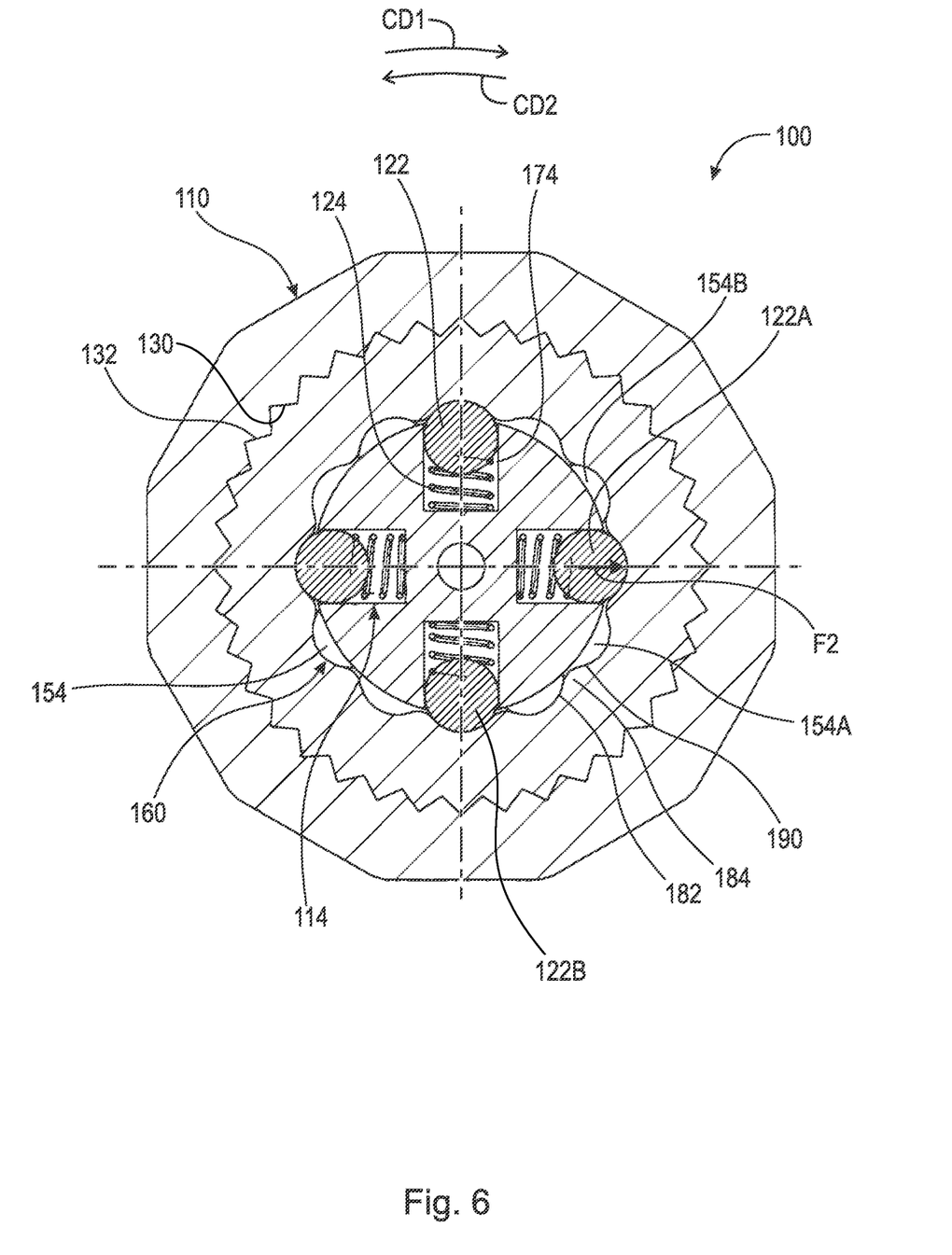
FIG. 6 is a cross-sectional view generally along line 6-6 in FIG. 4.

FIG. 6 is a cross-sectional view generally along line 6-6 in FIG. 4.

Figure 7:
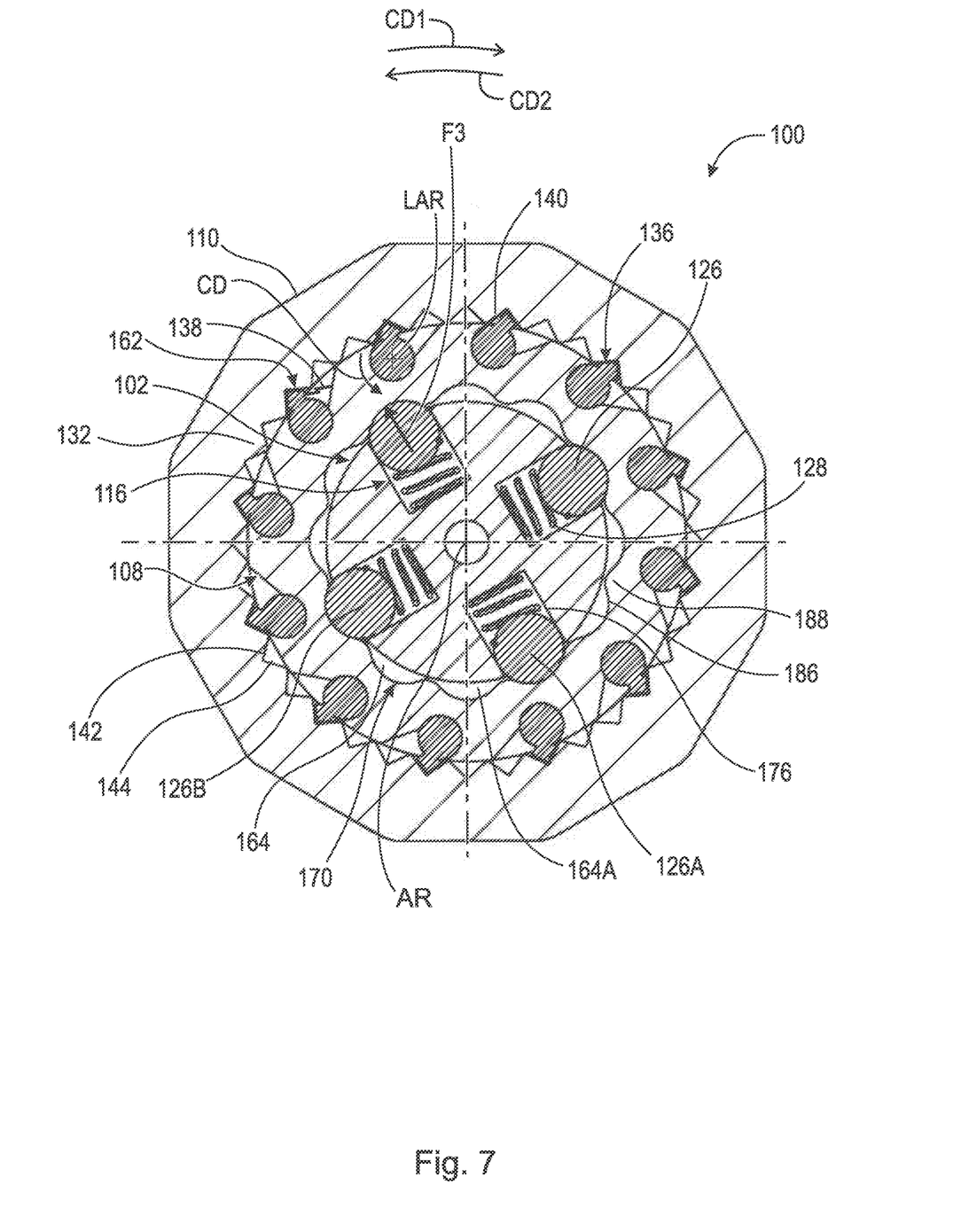
FIG. 7 is a cross-sectional view generally along line 7-7 in FIG. 4.

FIG. 7 is a cross-sectional view generally along line 7-7 in FIG. 4. The following should be viewed in light of FIGS. 1 through 7. In the example of FIGS. 1 through 7, slip clutch 100 includes: input hub 102; hub 104; hub 106; hub 108; and output hub 110. Hub 106 is non-rotatably connected to output hub 110. Input hub 102 is arranged to receive rotational torque. Input hub 102 includes slip clutch assemblies 112, 114, and 116. In an example embodiment: each assembly 112 includes ball 118 and spring 120; each assembly 114 includes ball 122 and spring 124; and each assembly 116 includes ball 126 and spring 128. Springs 120 urge balls 118 radially outwardly into contact with hub 104. Springs 124 urge balls 122 radially outwardly into contact with hub 106. Springs 128 urge balls 126 radially outwardly into contact with hub 108. Hub 106 and output hub 110 are non-rotatably connected, for example by splines 130 and 132 on hubs 106 and 110, respectively.

Springs 120 urge balls 118 radially outwardly to non-rotatably connect, with respect to rotation about axis AR, hubs 102 and 104 with force F1. Springs 124 urge balls 122 radially outwardly to non-rotatably connect, with respect to rotation about axis AR, hubs 102 and 106 with force F2. Springs 128 urge balls 126 radially outwardly to non-rotatably connect, with respect to rotation about axis AR, hubs 102 and 108 with force F3.

By "non-rotatably connected" components, we mean that the components are connected so that whenever one of the components rotates about axis AR, all of the components rotate about axis AR, and relative rotation between components about axis AR is not possible.

In an example embodiment, slip clutch 100 includes at least one one-way clutch 134 engaged with hub 104 and output hub 110. Clutch 134 non-rotatably connects hubs 104 and 110 for relative rotation of hub 104, with respect to hub 110, in direction CD1. Clutch 134 enables rotation between hubs 104 and 110 for relative rotation of hub 104, with respect to hub 110, in direction CD2.

Each clutch 134 can be any one-way clutch known in the art. In the example of FIGS. 1 through 7, each clutch 134 includes link 136 and spring 138. To simplify the presentation, only one spring 138 is diagrammatically shown in FIG. 5. It should be understood that in the example of FIGS. 1 through 7, although not shown, each link 136 has an associated spring 138. Each link 136 includes axis of rotation LAR, and arm 140. Springs 138 urge links 136 in direction CD about axis LAR. Thus, springs 138 urge arms 140 into contact with splines 132. Relative rotation of hub 104 with respect to hub 110 in circumferential direction CD1 causes arms 140 to contact surfaces 142 of splines 132 facing at least partly in direction CD2, non-rotatably connecting hubs 104 and 110. Relative rotation of hub 104 with respect to hub 110 in circumferential direction CD2 causes arms 140 to slide along surfaces 144 of splines 132 facing at least partly in direction CD1, compressing springs 138 and enabling rotation of hub 104 in direction CD2 with respect to hub 110.

In an example embodiment, hub 104 includes grooves 146, surface 148 facing in axial direction AD1, and surface 150 facing in axial direction AD2. Grooves 146 are circumferentially disposed about radially inner surface 152 of hub 104 and in an example embodiment, extend from surface 148 to surface 150. Each ball 118 is disposed in a respective groove 146. In an example embodiment, at least one groove 146 is circumferentially disposed between each pair of circumferentially adjacent balls 118. For example, groove 146A is disposed between circumferentially adjacent balls 118A and 118B. A reference character "[number] [number][number][letter]" represents a specific example of a group of elements "[number] [number][number]." For example, ball 118A is a specific example from balls 118.

In an example embodiment, hub 106 includes grooves 154, surface 156 facing in axial direction AD1, and surface 158 facing in axial direction AD2. Grooves 154 are circumferentially disposed about radially inner surface 160 of hub 106, and in an example embodiment, extend from surface 156 to surface 158. Each ball 122 is disposed in a respective groove 154. In an example embodiment, at least one groove 154 is circumferentially disposed between each pair of circumferentially adjacent balls 122. For example, groove 154A is disposed between circumferentially adjacent balls 122A and 122B.

In an example embodiment, slip clutch 100 includes at least one one-way clutch 162 engaged with hub 108 and output hub 110. Clutch 162 non-rotatably connects hubs 108 and 110 for relative rotation of hub 108, with respect to hub 110, in direction CD1. Clutch 162 enables rotation between hubs 108 and 110 for relative rotation of hub 108, with respect to hub 110, in direction CD2.

Each clutch 162 can be any one-way clutch known in the art. In the example of FIGS. 1 through 7, each clutch 162 includes link 136 and spring 138. To simplify the presentation, only one spring 138 is diagrammatically shown in FIG. 7. It should be understood that in the example of FIGS. 1 through 7, although not shown, each link 136 has an associated spring 138. Each link 136 includes axis of rotation LAR, and arm 140. Springs 138 urge links 136 in direction CD about axis LAR. Thus, springs 138 urge arms 140 into contact with splines 132. Relative rotation of hub 108 with respect to hub 110 in circumferential direction CD1 causes arms 140 to contact surfaces 142 of splines 132 facing at least partly in direction CD2, non-rotatably connecting hubs 108 and 110. Relative rotation of hub 108 with respect to hub 110 in circumferential direction CD2 causes arms 140 to slide along surfaces 144 of splines 132 facing at least partly in direction CD1, compressing springs 138 and enabling rotation of hub 108 in direction CD2 with respect to hub 110.

In an example embodiment, hub 108 includes grooves 164, surface 166 facing in axial direction AD1, and surface 168 facing in axial direction AD2. Grooves 164 are circumferentially disposed about radially inner surface 170 of hub 108 and in an example embodiment, extend from surface 166 to surface 168. Each ball 126 is disposed in a respective groove 164. In an example embodiment, at least one groove 164 is circumferentially disposed between each pair of circumferentially adjacent balls 126. For example, groove 164A is disposed between circumferentially adjacent balls 126A and 126B.

Input hub 102 includes slots 172, 174 and 176. A ball 118 and a spring 120 are disposed in each slot 172. A ball 122 and a spring 124 are disposed in each slot 174. A ball 126 and a spring 128 are disposed in each slot 176.

Figure 8:
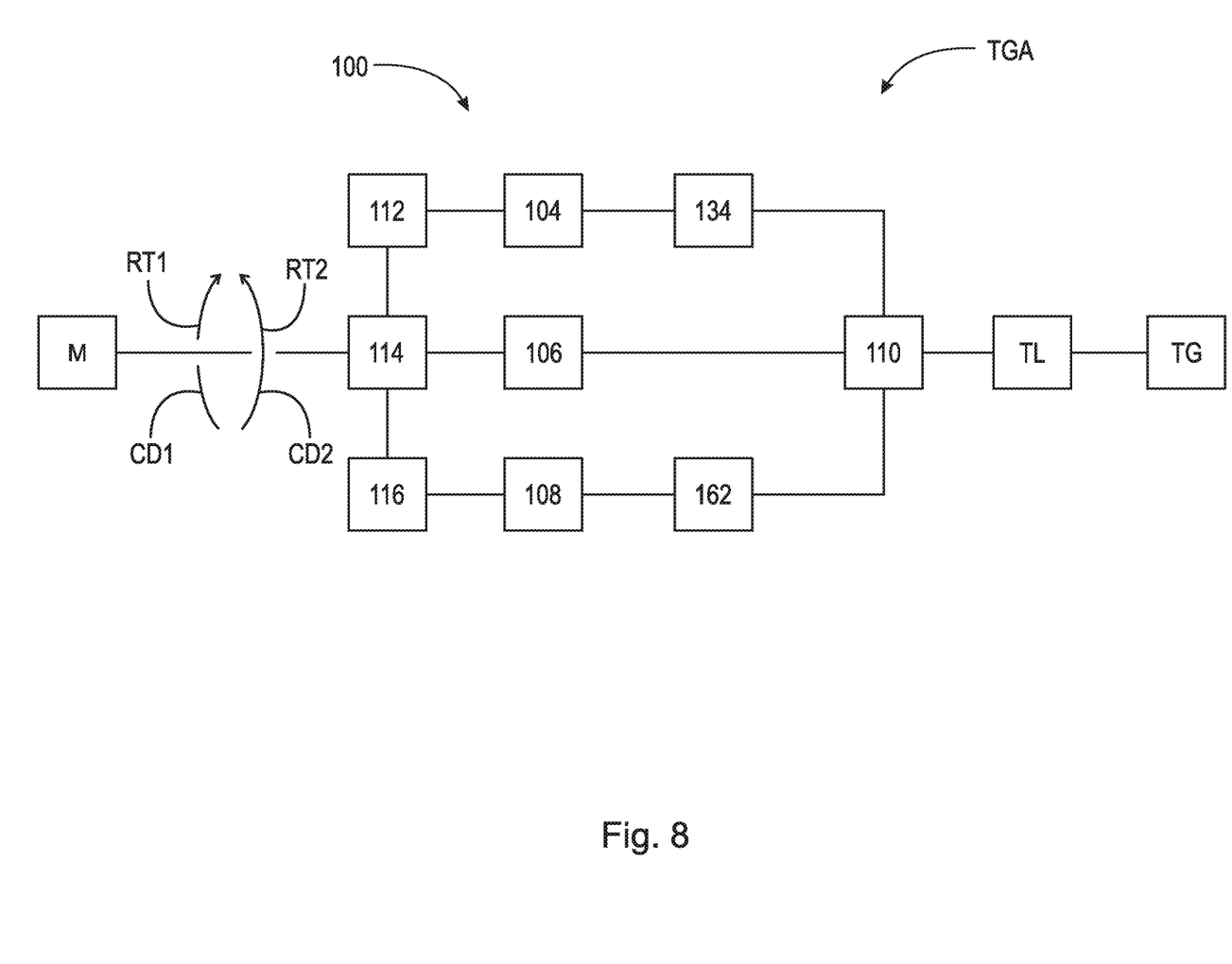
FIG. 8 is a block diagram showing an example application of the slip clutch shown in FIG. 1 in a tail gate assembly.

FIG. 8 is a block diagram showing an example application of clutch 100, shown in FIG. 1, in tail gate assembly TGA. The following should be viewed in light of FIGS. 1 through 8. Assembly TGA includes tail gate TG non-rotatably connected to output hub 110, and motor M providing rotational torque RT1 and RT2 to input hub 102 in directions CD1 and CD2, respectively. Tail gate TG impresses torque load TL on output hub 110. TL resists rotation of output hub 110 by motor M and input hub 102. In the example of FIG. 8, motor M: provides rotational torque RT1 to close tail gate TG; and provides rotational torque RT2 to open tail gate TG.

As noted above: balls 118 non-rotatably connect hubs 102 and 104 with force F1; balls 122 non-rotatably connect hubs 102 and 106 with force F2; and balls 126 non-rotatably connect hubs 102 and 108 with force F3. For RT1: clutches 134 non-rotatably connect hubs 104 and 110; and clutches 162 non-rotatably connect hubs 108 and 110. Therefore, hub 102 is non-rotatably connected to hub 110 by hubs 104, 106 and 108 with force equal to forces F1+F2+F3. For RT2: clutches 134 and 162 are in a free-wheel mode; hubs 104 and 108 are rotatable with respect to hub 110; and hub 102 is non-rotatably connected to hub 110 only by hub 106 and only with force F2.

When torque RT1 is less than or equal to forces F1+F2+F3: balls 118 non-rotatably connect hubs 102 and 104; balls 122 non-rotatably connect hubs 102 and 106; balls 126 non-rotatably connect hubs 102 and 108; hubs 102 and 110 are non-rotatably connected; and torque RT1 is transmitted to hub 110. When torque RT1 is greater than forces F1+F2+F3, hub 102 rotates with respect to hubs 104, 106 and 108 in direction CD1. Therefore, hub 102 rotates with respect to hub 110 in direction CD1 and torque RT1 is not transmitted to hub 110.

When torque RT2 is less than or equal to force F2: balls 122 non-rotatably connect hubs 102 and 106; and torque RT2 is transmitted to hub 110. Due to clutches 134 and 162, hubs 104 and 108 are rotatable with respect to hub 110 in direction CD2 and forces F1 and F3 are not factors. When torque RT2 is greater than force F2, hub 102 rotates with respect to hub 106. Therefore, hub 102 rotates with respect to hub 110 in direction CD2 and torque RT2 is not transmitted to hub 110.

When torque RT1 is greater than or equal to forces F1+F2+F3: hubs 104, 106 and 108 are rotationally fixed by load TL; hub 102 rotates in direction CD1; hubs 104 and 108 compress balls 118 and 126, respectively, radially inwardly; and hub 106 compresses balls 122 radially inwardly. Each ball 118 displaces to a groove 146 adjacent in direction CD1, each ball 122 displaces to a groove 154 adjacent in direction CD1, and each ball 126 displaces to a groove 164 adjacent in direction CD1. For example: shoulders 178 for grooves 146 push balls 118 radially inwardly such that peaks 180, between circumferentially adjacent grooves 146, slide over respective balls 118; shoulders 182, for grooves 154, push balls 122 radially inwardly such that peaks 184, between circumferentially adjacent grooves 154, slide over respective balls 122; and shoulders 186, for grooves 164, push balls 126 radially inwardly such that peaks 188, between circumferentially adjacent grooves 164, slide over respective balls 126. For example: ball 118A displaces into groove 146A; ball 122A displaces into groove 154A; and ball 126A displaces into groove 164A. Thus, hub 102 rotates with respect to hub 110 in direction CD1.

When torque RT2 is greater than or equal to force F2: hub 106 is rotationally fixed by load TL; and hub 106 compresses balls 118 radially inwardly so that each ball 118 displaces to a circumferentially adjacent groove 154. For example, hub 106, in particular shoulders 190 for grooves 164, pushes balls 122 radially inwardly such that peaks 184 slide over respective balls 122. As a result, balls 122 displace into respective grooves 154, circumferentially adjacent in direction CD2. For example, ball 122A displaces into groove 154B. Thus, hub 102 rotates with respect to hub 110 in direction CD2.

As torque RT1 is applied in direction CD1, clutch 100 can be overdriven in direction CD1, for example by application of manual force on tail gate TG and hub 110 greater than forces F1+F2+F3. With the application of the manual force: one-way clutches 134 and 162 are over driven (relative rotation of hubs 104 and 108 with respect to hub 110 in direction CD2) to enable rotation of hub 110 and tail gate TG with respect to hubs 104 and 108; force F1 for hub 106 is over ridden to enable rotation of hub 106 with respect to hub 102; and hub 110 and tail gate TG rotate with respect to hub 102 in direction CD1.

As torque RT2 is applied in direction CD2, clutch 100 can be overdriven in direction CD2, for example by application of manual force on tail gate TG and hub 110 greater than force F2. Hub 102 is already rotating in direction CD2 with respect to hub 104 and 108; therefore, clutches 134 and 162 continue to be over driven by the manual force. With the application of the manual force: force F1 for hub 106 is over ridden to enable rotation of hub 106 with respect to hub 102; and hub 110 and tail gate TG rotate with respect to hub 102 in direction CD2.

Slip clutch 100 provides a maximum torque to output hub 110 that is dependent on the direction of the torque on input hub 102. Using the example of FIG. 8, more force is typically needed to close tailgate TG than to open tailgate TG due to gravity acting against the closing action. Clutch 100 provides a larger torque capacity to close tailgate TG (for example forces F1+F2+F3) than to close tailgate TG (for example force F2). Springs 120, 124 and 128 can be selected to provide desired forces F1, F2 and F3, respectively.

Another consideration is preventing damage to clutch 100 if an object blocks rotation of hub 110, for example if an object blocks the closing or opening movement of tailgate TG. This also is a safety consideration, for example, if the object is a person. To address the preceding concerns, slip clutch assemblies 112, 114 and 116 enable hub 102 to rotate with respect to hubs 104, 106, and 108, respectively, to disrupt torque transmission to output hub 110.

Clutch 100 provides a modular framework for fabricating clutch 100 with a variety of torque capacities. For example, using the same balls 118, 122 and 126 and a same configuration of slots 172, 174 and 176, springs 120, 124 and 128 can be selected to attain a plethora of torque capacities for rotation of hub 102 in directions CD1 and CD2.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS 10 cylindrical system
11 axis of rotation
AD1 axial direction
AD2 axial direction
RD1 radial direction
RD2 radial direction
CD1 circumferential direction
CD2 circumferential direction
R radius
12 object
13 object
14 object
15A surface
15B surface
15C edge
16A surface
16B edge
17A radius
17B radius
18 surface
19 circumference
20 radius
AR axis of rotation
AR axis of rotation, clutch 100
F1 connecting force
F2 connecting force
F3 connecting force
L1 axial line
L2 axial line-
LAR axis of rotation, link 124
100 slip clutch
102 input hub
104 hub
106 hub
108 hub
110 output hub
112 slip clutch assembly
114 slip clutch assembly
116 slip clutch assembly
118 ball
120 spring
122 ball
124 spring
126 ball
128 spring
130 spline, hub 106
132 spline, hub 110
134 one-way clutch
136 link, one-way clutch
138 spring, one-way clutch
140 arm, link 136
142 surface, spline 132
144 surface, spline 132
146 groove, hub 104
148 surface, hub 104
150 surface, hub 104
152 radially inner surface, hub 104
154 groove, hub 106
156 surface, hub 106
158 surface, hub 106
160 radially inner surface, hub 106
162 one-way clutch
164 groove, hub 108
166 surface, hub 108
168 surface, hub 108
170 radially inner surface, hub 108
172 slot, hub 102
174 slot, hub 102
176 slot, hub 102
178 shoulder, groove 146
180 peak, hub 104
182 shoulder, groove 154
184 peak, hub 106
186 shoulder, groove 164
188 peak, hub 108
190 shoulder, groove 164

The invention claimed is:

1. A slip clutch, comprising:
an output hub;
a first hub;
a second hub non-rotatably connected to the output hub;
an input hub arranged to receive rotational torque, the input hub including:
a first plurality of balls;
a first plurality of springs urging the first plurality of balls radially outwardly into contact with the first hub;
a second plurality of balls; and,
a second plurality of springs urging the second plurality of balls radially outwardly into contact with the second hub.

2. The slip clutch of claim 1, further comprising:
at least one one-way clutch:
blocking rotation of the first hub, with respect to the output hub, in a first circumferential direction; and,
enabling rotation of the first hub, with respect to the output hub, in a second circumferential direction, opposite the first circumferential direction.

3. The slip clutch of claim 1, wherein:
the first plurality of balls non-rotatably connects the input hub and the first hub with a first force;
the second plurality of balls non-rotatably connects the input hub and the second hub with a second force; and,
the first force is not equal to the second force.

4. The slip clutch of claim 1, wherein:
the first plurality of balls non-rotatably connects the input hub and the first hub with a first force;
the second plurality of balls non-rotatably connects the input hub and the second hub with a second force; and,
the first force is equal to the second force.

5. The slip clutch of claim 1, further comprising:
at least one one-way clutch engaged with the first hub and the output hub, wherein:
the first plurality of balls non-rotatably connects the input hub and the first hub with a first force;
the second plurality of balls non-rotatably connects the input hub and the second hub with a second force;
the first plurality of balls and the second plurality of balls non-rotatably connect the input hub to the output hub, with the first force plus the second force, for rotation of the input hub in a first circumferential direction; and,
for rotation of the input hub in a second circumferential direction, opposite the first circumferential direction:
the at least one one-way clutch enables rotation of the first hub, with respect to the output hub, in the second circumferential direction; and, the second plurality of balls connects the input hub to the second hub with the second force.

6. The slip clutch of claim 1, wherein:
the first hub includes a first plurality of grooves;
the first plurality of balls is disposed in the first plurality of grooves;
the second hub includes a second plurality of grooves; and,
the second plurality of balls is disposed in the second plurality of grooves.

7. The slip clutch of claim 6, wherein:
a respective groove from the first plurality of grooves is circumferentially disposed between each pair of circumferentially adjacent balls in the first plurality of balls; and,
a respective groove from the second plurality of grooves is circumferentially disposed between each pair of circumferentially adjacent balls in the second plurality of balls.

8. The slip clutch of claim 1, wherein:
the slip clutch is supported for rotation around an axis of rotation;
a first line, parallel to the axis of rotation, passes through the first plurality of balls without passing through the second plurality of balls; and,
a second line, parallel to the axis of rotation, passes through the second plurality of balls without passing through the first plurality of balls.

9. The slip clutch of claim 1, wherein the second plurality of balls is axially off-set from the first plurality of balls.

10. The slip clutch of claim 1, wherein:
the first hub is radially disposed between the input hub and the output hub; and,
the second hub is radially disposed between the input hub and the output hub.

11. The slip clutch of claim 1, further comprising:
a third hub, wherein:
the input hub includes:
a third plurality of balls; and,
a third plurality of springs urging the third plurality of balls radially outwardly into contact with the third hub; and,
the third plurality of balls non-rotatably connects the input hub and the third hub with a first force.

12. The slip clutch of claim 11, further comprising:
at least one one-way clutch:
blocking rotation of the third hub, with respect to the output hub, in a first circumferential direction; and,
enabling rotation of the third hub, with respect to the output hub, in a second circumferential direction, opposite the first circumferential direction.

13. A slip clutch, comprising:
an output hub;
a first hub;
a second hub non-rotatably connected to the output hub;
an input hub arranged to receive rotational torque and including:
a first slip clutch assembly non-rotatably connecting the input hub and the first hub with a first force; and,
a second slip clutch assembly non-rotatably connecting the input hub and the second hub with a second force; and,
a first plurality of one-way clutches:
blocking rotation of the first hub with respect to the output hub in a first circumferential direction; and,
enabling rotation of the first hub with respect to the output hub in a second circumferential direction, opposite the first circumferential direction.

14. The slip clutch of claim 13, wherein:
the input hub includes:
a first plurality of radially inwardly extending slots; and,
a second plurality of radially inwardly extending slots;
the first slip clutch assembly includes:
a plurality of first balls disposed in the first plurality of radially inwardly extending slots and in contact with the first hub; and,
a first plurality of springs disposed in the first plurality of radially inwardly extending slots and urging the plurality of first balls radially outwardly; and,
the second slip clutch assembly includes:
a plurality of second balls disposed in the second plurality of radially inwardly extending slots and in contact with the second hub; and,
a second plurality of springs disposed in the second plurality of radially inwardly extending slots and urging the plurality of second balls radially outwardly.

15. The slip clutch of claim 14, wherein:
the first hub includes a plurality of first grooves;
each first ball is disposed in a respective first groove;
the second hub includes a plurality of second grooves;
each second ball is disposed in a respective second groove;
the respective first groove is circumferentially disposed between each pair of circumferentially adjacent first balls; and,
the respective second groove is circumferentially disposed between each pair of circumferentially adjacent second balls.

16. The slip clutch of claim 13, further comprising:
a third hub; and,
a second plurality of one-way clutches:
blocking rotation of the third hub, with respect to the output hub, in the first circumferential direction; and,
enabling rotation of the third hub, with respect to the output hub, in the second circumferential direction, wherein the input hub includes a third slip clutch assembly non-rotatably connecting the input hub and the third hub with a third force.

17. The slip clutch of claim 16, wherein:
the input hub includes a third plurality of radially inwardly extending slots;
the third slip clutch assembly includes:
a plurality of third balls disposed in the third plurality of radially inwardly extending slots and in contact with the third hub; and,
a third plurality of springs disposed in the third plurality of radially inwardly extending slots and urging the plurality of third balls radially outwardly;
the third hub includes a plurality of third grooves;
each third ball is disposed in a respective third groove; and,
the respective third groove is circumferentially disposed between each pair of circumferentially adjacent third balls.

18. The slip clutch of claim 16, wherein the second hub is axially disposed between the first hub and the third hub.

19. The slip clutch of claim 13, wherein the input hub is located radially inwardly of the output hub.

20. A slip clutch, comprising:
an axis of rotation;

an output hub;
a first hub;
a second hub;
a third hub non-rotatably connected to the output hub and axially disposed between the first and second hubs;
an input hub arranged to receive rotational torque and including:
  a first slip clutch assembly non-rotatably connecting the input hub and the first hub with a first force;
  a second slip clutch assembly non-rotatably connecting the input hub and the second hub with a second force; and,
  a third slip clutch assembly non-rotatably connecting the input hub and the third hub with a third force;
a first plurality of one-way clutches blocking rotation of the first hub, with respect to the output hub in a first circumferential direction; and,
a second plurality of one-way clutches blocking rotation of the second hub, with respect to the output hub, in the first circumferential direction.

\* \* \* \* \*